(12) United States Patent
Rose et al.

(10) Patent No.: US 9,800,905 B2
(45) Date of Patent: Oct. 24, 2017

(54) DEVICE BASED AUDIO-FORMAT SELECTION

(71) Applicant: COMCAST CABLE COMMUNICATIONS, LLC, Philadelphia, PA (US)

(72) Inventors: Dave Rose, Parker, CO (US); White Webuye, Aurora, CO (US); Dave Ohare, Glendale, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 14/853,680

(22) Filed: Sep. 14, 2015

(65) Prior Publication Data

US 2017/0078710 A1 Mar. 16, 2017

(51) Int. Cl.
| | |
|---|---|
| H04N 7/16 | (2011.01) |
| H04N 7/18 | (2006.01) |
| H04N 21/233 | (2011.01) |
| H04N 21/258 | (2011.01) |
| H04N 21/45 | (2011.01) |
| H04N 21/658 | (2011.01) |
| H04N 21/422 | (2011.01) |
| H04N 21/442 | (2011.01) |
| H04N 21/439 | (2011.01) |
| H04H 60/58 | (2008.01) |
| G06F 17/30 | (2006.01) |

(52) U.S. Cl.
CPC ......... *H04N 21/2335* (2013.01); *G06F 17/30* (2013.01); *H04H 60/58* (2013.01); *H04N 21/25833* (2013.01); *H04N 21/42203* (2013.01); *H04N 21/4394* (2013.01); *H04N 21/44213* (2013.01); *H04N 21/4516* (2013.01); *H04N 21/6582* (2013.01)

(58) Field of Classification Search
CPC ......... H04N 21/4394; H04N 21/42203; H04H 60/58
USPC .............................................. 725/62, 81, 80
See application file for complete search history.

(56) References Cited

U.S. PATENT DOCUMENTS

| 4,677,389 | A | * | 6/1987 | Op de Beek ............ H03G 3/32 330/129 |
| 6,678,505 | B1 | * | 1/2004 | Leason ................. H04B 1/3877 455/345 |
| 2005/0168453 | A1 | * | 8/2005 | Ueda ...................... G11B 20/10 345/204 |
| 2006/0171373 | A1 | * | 8/2006 | Li .......................... G10L 19/005 370/352 |
| 2006/0271965 | A1 | * | 11/2006 | Tokimoto ........... H04N 5/44543 725/62 |

(Continued)

*Primary Examiner* — Pankaj Kumar
*Assistant Examiner* — Franklin Andramuno
(74) *Attorney, Agent, or Firm* — Banner & Witcoff, Ltd.

(57) ABSTRACT

In accordance with one or more embodiments, digitally encoded audio may be sent by a computing system to a user system over a network. The user system may receive the digitally encoded audio, may produce a sound encoded within the digitally encoded audio, and may record a sample of the sound as produced by the user system. The sample may be analyzed, a format of digitally encoded audio may be selected based on the analysis, and audio digitally encoded in accordance with the selected format may be sent by the computing system to the user system over the network.

21 Claims, 8 Drawing Sheets

(56) References Cited

U.S. PATENT DOCUMENTS

| | | | |
|---|---|---|---|
| 2011/0061083 A1* | 3/2011 | Bell | H04M 3/533 |
| | | | 725/100 |
| 2013/0183944 A1* | 7/2013 | Mozer | H04L 12/282 |
| | | | 455/414.1 |
| 2015/0234564 A1* | 8/2015 | Snibbe | G06F 3/0488 |
| | | | 715/716 |
| 2015/0287403 A1* | 10/2015 | Holzer Zaslansky | |
| | | | G06T 13/205 |
| | | | 704/231 |

* cited by examiner

DEVICE BASED AUDIO-FORMAT SELECTION

BACKGROUND

Digital audio content can be communicated over networks in various different formats. When content is available in multiple formats, each of the available formats is often communicated over the network. In a broadcast or multicast context, communicating each of the available formats may be preferred, so that various receiving devices can select an appropriate format based on their respective configurations or capabilities. In a unicast or individualized context, however, communicating multiple audio formats may unnecessarily consume network resources. Accordingly, a need exists for device-based audio-format selection.

SUMMARY

This disclosure relates to device-based audio-format selection. In accordance with one or more embodiments, digitally encoded audio may be sent by a computing system to a user system over a network. The user system may receive the digitally encoded audio, may produce a sound encoded within the digitally encoded audio, and may record a sample of the sound as produced by the user system. The sample may be analyzed, a format of digitally encoded audio may be selected based on the analysis, and audio digitally encoded in accordance with the selected format may be sent by the computing system to the user system over the network.

This summary is not intended to identify critical or essential features of the disclosure, but merely to summarize certain features and variations thereof. Other details and features will be described in the sections that follow.

BRIEF DESCRIPTION OF THE DRAWINGS

Some features herein are illustrated by way of example, and not by way of limitation, in the figures of the accompanying drawings, in which like reference numerals refer to similar elements, and in which.

DETAILED DESCRIPTION

Figure 1:
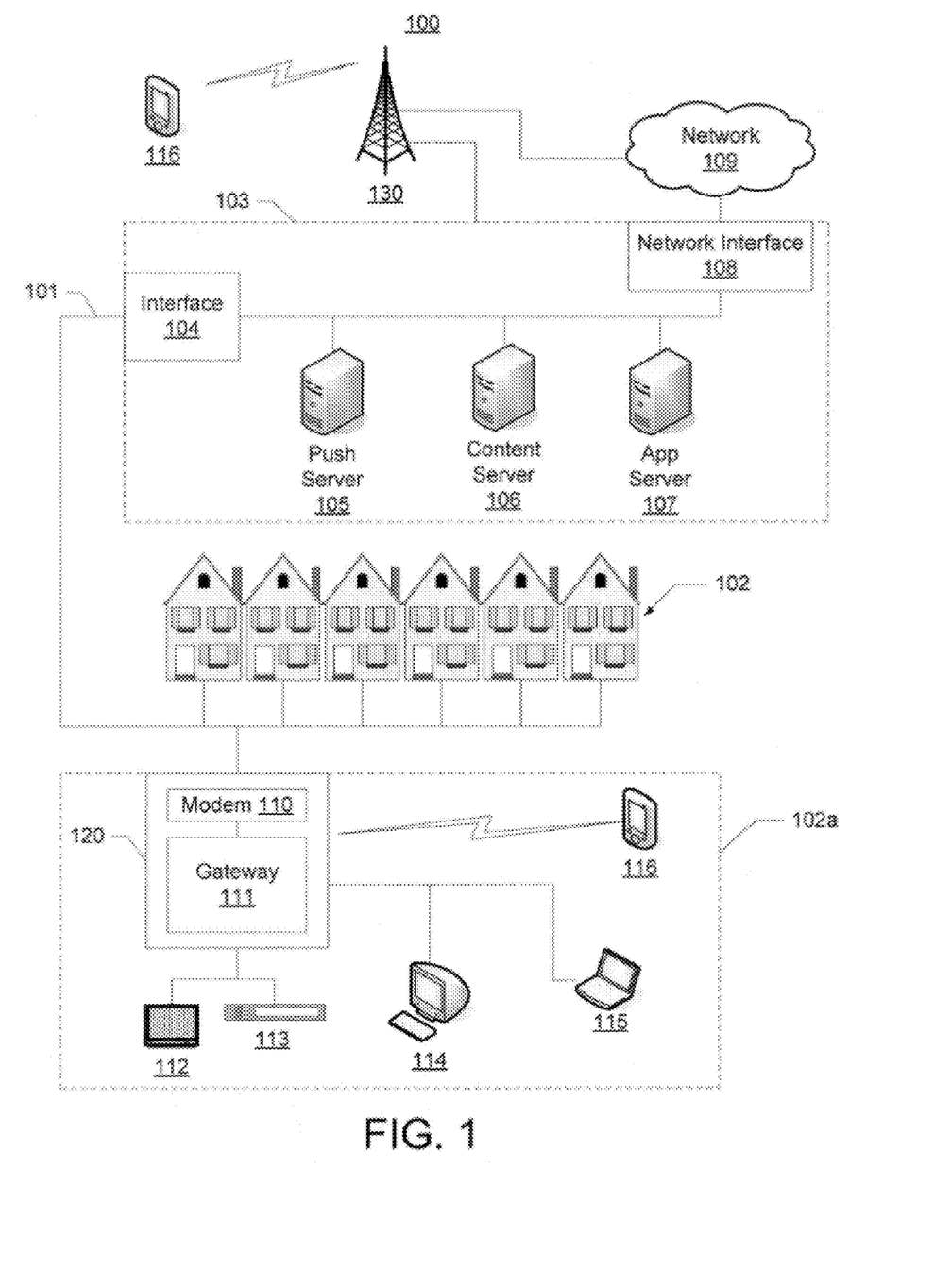
FIG. 1 depicts an illustrative network environment in which one or more aspects of the disclosure may be implemented.

FIG. 1 illustrates an example information distribution network in which one or more of the various features described herein may be implemented. The illustrated information distribution network is only one example of a network and is not intended to suggest any limitation as to the scope of use or functionality of the disclosure. The illustrated network should not be interpreted as having any dependency or requirement relating to any component or combination of components in an information distribution network.

A network 100 may be a telecommunications network, a Multi-Service Operator (MSO) network, a cable television (CATV) network, a cellular network, a wireless network, an optical fiber network, a coaxial cable network, a Hybrid Fiber-Coaxial (HFC) network, or any other type of information distribution network or combination of networks. For example, the network 100 may be a cellular broadband network communicating with multiple communications access points, such as a wireless communications tower 130. In another example, the network 100 may be a coaxial system comprising a Cable Modem Termination System (CMTS) communicating with numerous gateway interface devices (e.g., a gateway 111 in an example home 102a). In another example, the network 100 may be a fiber-optic system comprising optical fibers extending from an Optical Line Terminal (OLT) to numerous Optical Network Terminals (ONTs) communicatively coupled with various gateway interface devices. In another example, the network 100 may be a Digital Subscriber Line (DSL) system that includes a local office 103 communicating with numerous gateway interface devices. In another example, the network 100 may be an HFC network in which Internet traffic is routed over both optical and coaxial communication paths to a gateway interface device in or near a user's home. Various aspects of the disclosure may operate on one or more of the networks described herein or any other network architectures now known or later developed.

The network 100 may use a series of interconnected communication links 101 (e.g., coaxial cables, optical fibers, wireless links, etc.) to connect a premises 102 (e.g., a home or other user environment) to the local office 103. The communication links 101 may include any wired communication links, wireless communication links, communications networks, or combinations thereof. For example, portions of the communication links 101 may be implemented with fiber-optic cable, while other portions of the communication links 101 may be implemented with coaxial cable. The communication links 101 may also include various communications components such as splitters, filters, amplifiers, wireless components, and other components for communicating data. Data may include, for example, Internet data, voice data, weather data, media content, and any other information. Media content may include, for example, video content, audio content, media on demand, video on demand, streaming video, television programs, text listings, graphics, advertisements, and other content. A media content item may represent an individual piece of media content, such as a particular movie, television episode, online video clip, song, audio recording, image, or any other data. In some instances, a media content item may be fragmented into segments, such as a plurality of two-second video fragments that may be separately addressed and retrieved.

The local office 103 may transmit downstream information signals onto the communication links 101, and one or more of the premises 102 may receive and process those signals. In certain implementations, the communication links 101 may originate from the local office 103 as a single communications path, and may be split into any number of communication links to distribute data to the premises 102 and various other destinations. Although the term premises is used by way of example, the premises 102 may include any type of user environment, such as single family homes, apartment complexes, businesses, schools, hospitals, parks, and other environments and combinations of environments.

The local office 103 may include an interface 104, which may be a computing device configured to manage communications between devices on the network of the communication links 101 and backend devices, such as a server. For example, the interface 104 may be a CMTS. The termination system may be as specified in a standard, such as, in an example of an HFC-type network, the Data Over Cable Service Interface Specification (DOCSIS) standard, published by Cable Television Laboratories, Inc. The termination system may be configured to transmit data over one or more downstream channels or frequencies to be received by various devices, such as modems in the premises 102, and to receive upstream communications from those modems on one or more upstream frequencies.

The local office 103 may include one or more network interfaces 108 for communicating with one or more external networks 109. The one or more external networks 109 may include, for example, one or more telecommunications networks, Internet Protocol (IP) networks, cellular communications networks (e.g., Global System for Mobile Communications (GSM), Code Division Multiple Access (CDMA), and any other 2nd, 3rd, 4th, or higher generation cellular communications networks), cellular broadband networks, radio access networks, fiber-optic networks, local wireless networks (e.g., Wi-Fi, WiMAX), satellite networks, and any other networks or combinations of networks.

The local office 103 may include a variety of servers that may be configured to perform various functions. The local office 103 may include a push server 105 for generating push notifications to deliver data, instructions, or both to devices that are configured to detect such notifications. The local office 103 may include a content server 106 configured to provide content (e.g., media content) to devices. The local office 103 may also include an application server 107.

The premises 102, such as the example home 102a, may include an interface 120, which may include a modem 110 (or any device), for communicating on the communication links 101 with the local office 103, the one or more external networks 109, or both. For example, the modem 110 may be a coaxial cable modem (for coaxial cable links), a broadband modem (for DSL links), a fiber interface node (for fiber-optic links), or any other device or combination of devices. In certain implementations, the modem 110 may be a part of, or communicatively coupled to, the gateway 111. The gateway 111 may be, for example, a wireless router, a set-top box, a computer server, or any other computing device or combination.

The gateway 111 may be any computing device for communicating with the modem 110 to allow one or more other devices in the example home 102a to communicate with the local office 103, the one or more external networks 109, or other devices communicatively coupled thereto. The gateway 111 may include local network interfaces to provide communication signals to client devices in or near the example home 102a, such as a television 112, a set-top box 113, a personal computer 114, a laptop computer 115, a wireless device 116 (e.g., a wireless laptop, a tablet computer, a mobile phone, a portable gaming device a vehicular computing system, a mobile computing system, a navigation system, an entertainment system in an automobile, marine vessel, aircraft, or the like), or any other device.

Figure 2:
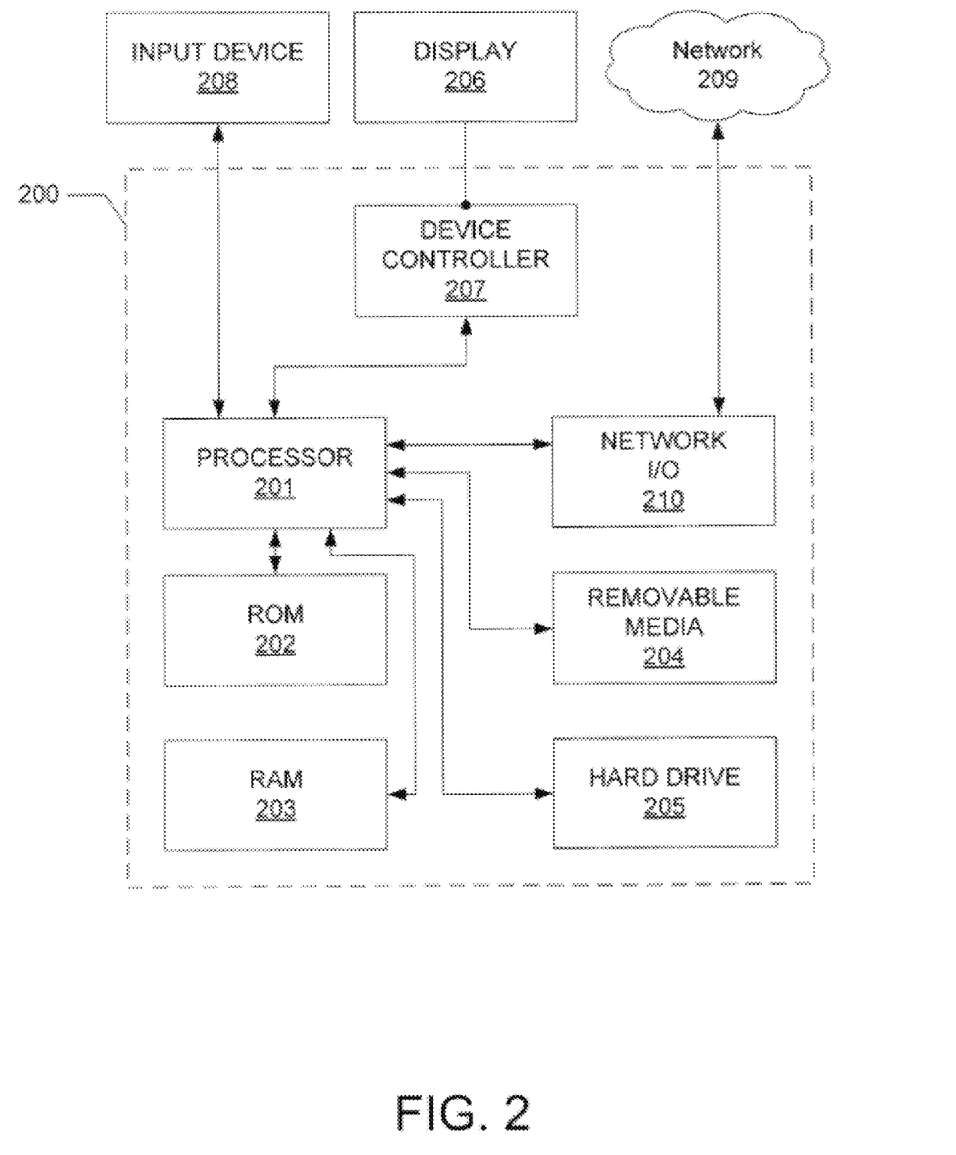
FIG. 2 depicts an illustrative software and hardware device on which various aspects of the disclosure may be implemented.

FIG. 2 illustrates general hardware elements and software elements that can be used to implement any of the various computing devices, servers, encoders, caches, and/or software discussed herein. A device 200 may include a processor 201, which may execute instructions of a computer program to perform any of the functions and steps described herein.

The instructions may be stored in any type of computer-readable medium or memory to configure the operation of the processor 201. For example, instructions may be stored in a Read-Only Memory (ROM) 202, a Random Access Memory (RAM) 203, a removable media 204, such as a Universal Serial Bus (USB) drive, Compact Disk (CD) or Digital Versatile Disk (DVD), hard drive, floppy disk, or any other desired electronic storage medium. Instructions may also be stored in a hard drive 205, which may be an internal or external hard drive.

The device 200 may include one or more output devices, such as a display 206 (e.g., an integrated or external display, monitor, or television), and may include a device controller 207, such as a video processor. In some embodiments, the device 200 may include an input device 208, such as a remote control, keyboard, mouse, touch screen, microphone, motion sensing input device, and/or any other input device.

The device 200 may also include one or more network interfaces, such as a network Input/Output (I/O) interface 210 to communicate with a network 209. The network interface may be a wired interface, wireless interface, or a combination of the two. In some embodiments, the network I/O interface 210 may include a cable modem, and the network 209 may include the communication links 101 shown in FIG. 1, the one or more external networks 109, an in-home network, a provider's wireless, coaxial, fiber, or hybrid fiber/coaxial distribution system (e.g., a DOCSIS network), and/or any other desired network.

Figure 3:
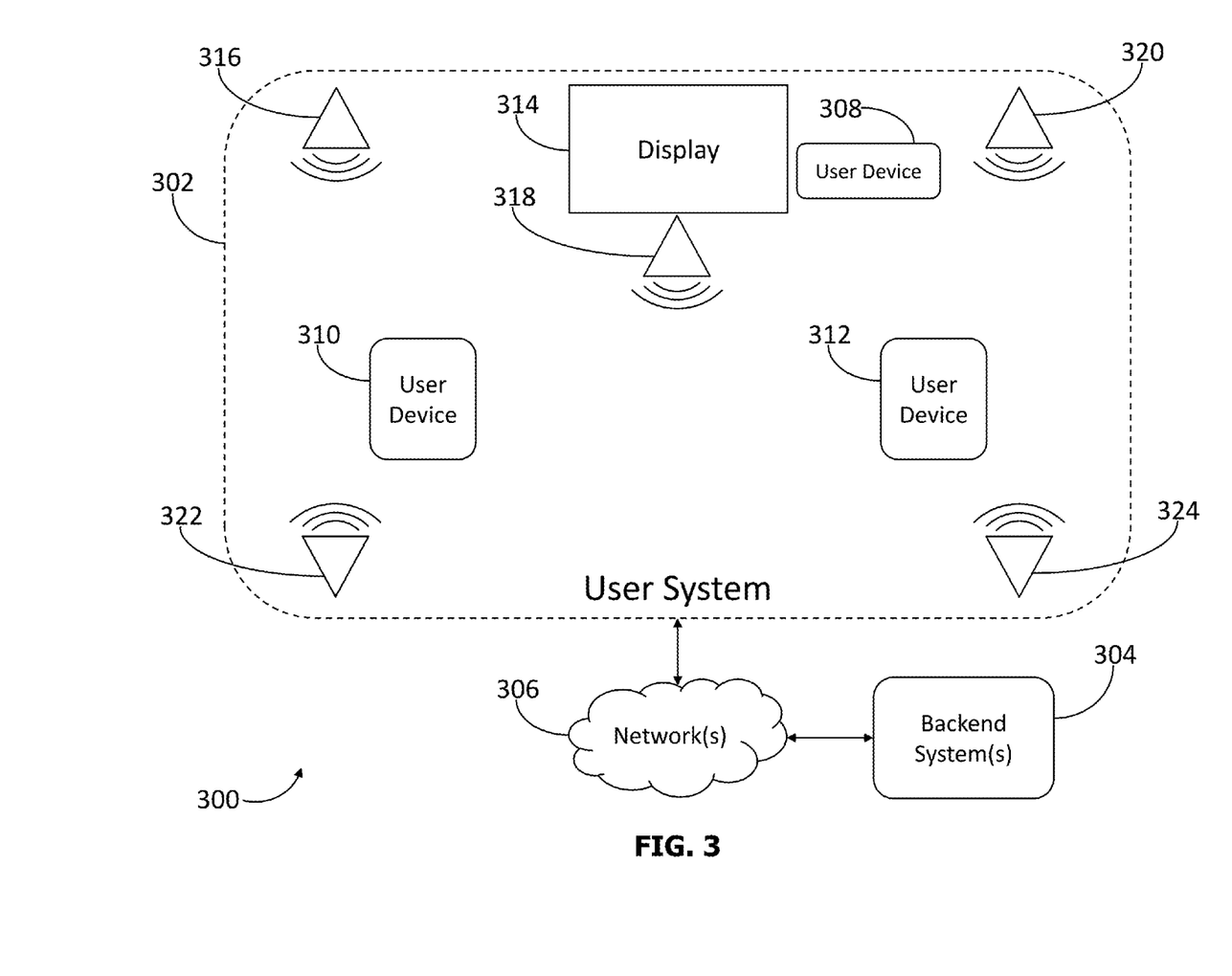
FIG. 3 depicts an illustrative environment for employing systems and methods in accordance with one or more aspects of the disclosure.

FIG. 3 depicts an illustrative environment for employing systems and methods in accordance with one or more aspects of the disclosure. Referring to FIG. 3, an environment 300 may include a user system 302 and one or more backend system(s) 304. The user system 302 and the backend system(s) 304 may be interfaced via one or more network(s) 306, which may include one or more LAN(s) and/or WAN(s) (e.g., one or more networks associated with the user system 302, the backend system(s) 304, one or more distribution or service-provider networks that interface the user system 302 and/or the backend system(s) 304 to the Internet, and/or the Internet, or portions thereof). The backend system(s) 304 may include one or more computing systems and/or devices (e.g., servers or the like) configured to perform one or more of the functions described herein (e.g., systems and/or devices for storing, selecting, and/or communicating digital media content). The user system 302 may include one or more user devices 308, 310, and 312, which may be associated with one another (e.g., via their inclusion within the user system 302, a connection to a network associated with the user system 302, an affiliation with a service provider or an account thereof, or the like). The user devices 308, 310, and 312 may include one or more computing devices (e.g., servers, personal computers, desktop computers, laptop computers, tablet computers, smartphones, mobile devices, media players, set-top boxes, or the like) configured to perform one or more of the functions described herein (e.g., interfacing with users, selecting media content items, displaying or producing associated media content, and/or generating or communicating data associated therewith).

In some embodiments, one or more of the user devices 308, 310, and 312 may include one or more hardware components described herein (e.g., speakers, microphones, displays, communication interfaces, memories, processors or the like). Additionally or alternatively, the user system 302 may include one or more peripheral devices, which may be associated with one or more of the user devices 308, 310, and 312. For example, the user system 302 may include a display 314, which may be associated with one or more of the user devices 308, 310, and 312 and may display aspects or components of video content received, processed, and/or stored by one or more of the user devices 308, 310, and 312. Similarly, the user system 302 may include one or more speakers 316, 318, 320, 322, and 324, which may be associated with one or more of the user devices 308, 310, and 312 and may produce aspects or components of audio content received, processed, and/or stored by one or more of the user devices 308, 310, and 312. As illustrated in FIG. 3, one or more of the speakers 316, 318, 320, 322, and 324 may be physically located in various physical locations relative to one or more other components of the user system 302 (e.g., the display 314, one or more of the user devices 308, 310, and 312, or one or more other speakers of the speakers 316, 318, 320, 322, and 324). For example, the speaker 316 may be located alongside and to the left of the display 314 (e.g., a front, left channel), the speaker 318 may be located near the display 314 (e.g., a center channel), the speaker 320 may be located alongside and to the right of the display 314 (e.g., a front, right channel), the speaker 322 may be located to the left of the display 314 and further in front of the display 314 than the speaker 316 (e.g., a rear, left channel), and the speaker 324 may be located to the right of the display 314 and further in front of the display 314 than the speaker 320 (e.g., a rear, right channel).

Figure 4:
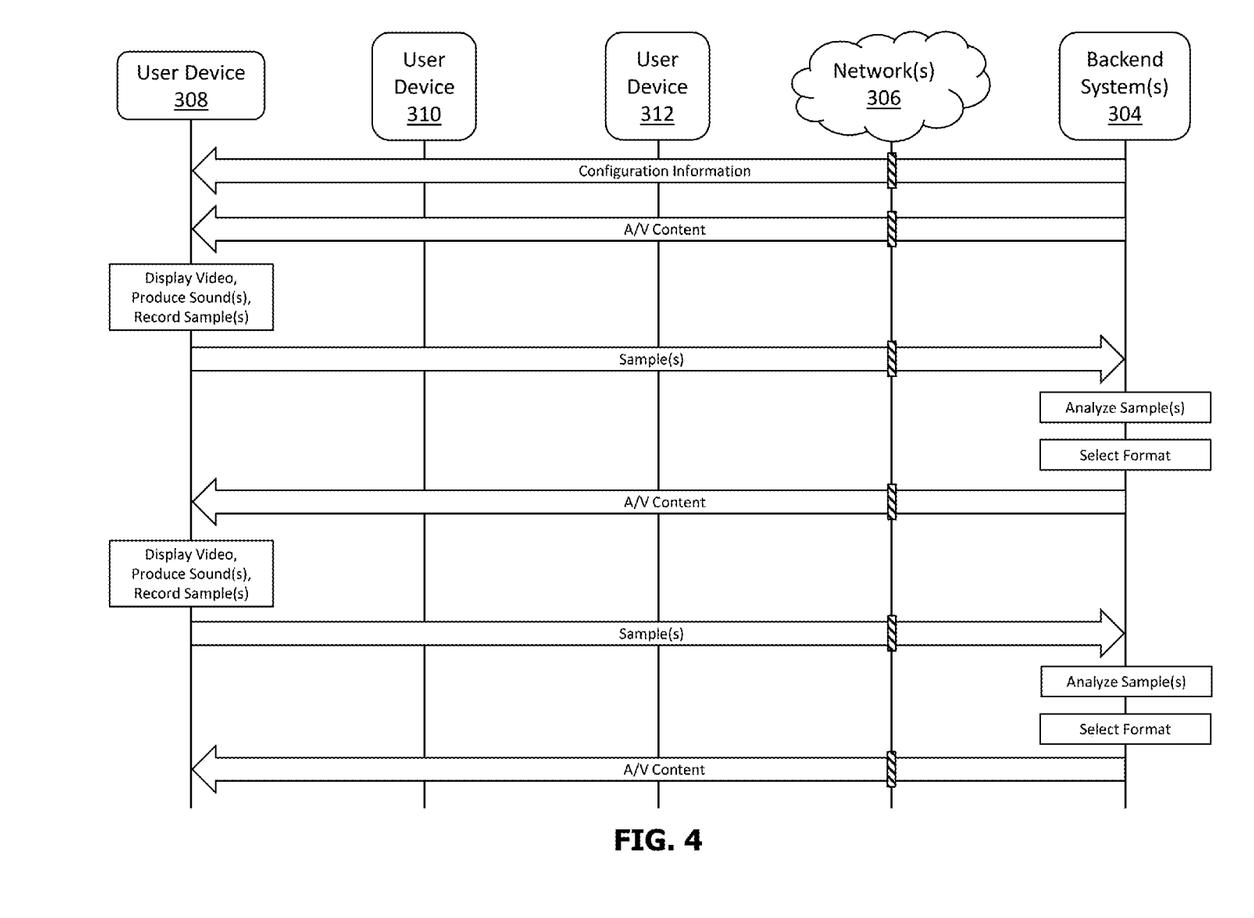
FIGS. 4, 5, 6, and 7 depict various illustrative event sequences in accordance with one or more aspects of the disclosure.

FIGS. 4, 5, 6, and 7 depict various illustrative event sequences in accordance with one or more aspects of the disclosure. The events and steps illustrated in FIGS. 4, 5, 6, and 7 are merely illustrative, and one of ordinary skill in the art will recognize that some steps or events may be omitted, may be performed or occur in an order other than that illustrated, and/or may be performed by or occur at a device other than that illustrated. Referring to FIG. 4, the backend system(s) 304 may generate data comprising configuration information and may communicate (e.g., via the network(s) 306) the data comprising the configuration information to the user device 308. For example, a user of the user system 302 may have selected media content available from the backend system(s) 304, which may have initiated a configuration routine configured to cause the backend system(s) 304 to generate the data comprising the configuration information and communicate the data comprising the configuration information to the user device 308. In some embodiments, the configuration information may be configured to cause the user system 302 to produce one or more sounds encoded within digital audio content and to record one or more samples of the sound(s) as produced by the user system 302. Additionally or alternatively, the configuration information may be configured to cause the user system 302 to instruct a user (e.g., via audio instructions produced by the user system 302, visual instructions displayed by the user system 302, or the like) to physically locate one or more of the user devices 308, 310, and 312 (e.g., a device configured to record the sample(s) of the sound(s)) in one or more specified physical locations (e.g., a location where the user intends to consume media content, or the like).

The backend system(s) 304 may generate data comprising digital media content (e.g., digitally encoded audio and/or video, or the like) and may communicate (e.g., via the network(s) 306) the data comprising the digital media content to the user device 308. For example, the digital media content may comprise the sound(s) (e.g., the sound(s) the configuration information configured the user system 302 to record) and/or graphical or video content for the user system 302 to display or produce (e.g., content indicating that the sound(s) are being recorded as part of the configuration routine). The user device 308 may cause the user system 302 to display the graphical or video content, produce the sound(s), and record the sample(s) of the sound(s) as produced by the user system 302. The user device 308 may communicate (e.g., via the network(s) 306) the sample(s) to the backend system(s) 304.

The backend system(s) 304 may analyze the sample(s). For example, the sound(s) may have been encoded at a plurality of different sampling rates, and the backend system(s) 304 may analyze the sample(s) to determine a maximum sampling rate that the user system 302 distinguishably produced relative to each other sampling rate of the plurality of different sampling rates. That is, the plurality of different sampling rates may include sampling rates that the user system 302 is capable of producing but that are not produced by the user system 302 in a manner that is distinguishable (e.g., from the perspective of a listener) from the maximum sampling rate determined by analyzing the sample(s). The selected media content may comprise a digitally encoded video asset (e.g., a movie, television program, or the like) and a plurality of formats of digitally encoded audio associated with the video asset, and the backend system(s) 304 may select, from amongst the plurality of formats, a format encoded at the maximum sampling rate determined by analyzing the sample(s). The backend system(s) 304 may generate data comprising at least a portion of the video asset and corresponding audio (e.g., audio encoded at the maximum sampling rate) and may communicate (e.g., via the network(s) 306) the data comprising the at least a portion of the video asset and the corresponding audio to the user device 308. The data comprising the at least a portion of the video asset and the corresponding audio may comprise one or more sound(s) that the user system 302 is configured to record (e.g., the corresponding audio may include such sound(s)).

The user device 308 may cause the user system 302 to display the at least a portion of the video asset, produce the corresponding audio, and record sample(s) of the sound(s) as produced by the user system 302. The user device 308 may communicate (e.g., via the network(s) 306) the sample(s) to the backend system(s) 304. The backend system(s) 304 may analyze the sample(s). For example, the sound(s) (e.g., a portion of the audio corresponding to the at least a portion of the video asset) may have been encoded at a plurality of different sampling rates (e.g., sampling rates other than the maximum sampling rate previously determined), and the backend system(s) 304 may analyze the sample(s) to determine a new maximum sampling rate that the user system 302 distinguishably produced relative to each other sampling rate of the plurality of different sampling rates. That is, one or more conditions, such as a configuration of the user system 302 (e.g., a change in speaker configuration) or an associated environmental variable (e.g., a level of background noise) may have changed since the sample(s) previously analyzed were recorded, and the backend system(s) 304 may determine that the user system 302 is capable of producing audio encoded at a different sampling rate (e.g., a higher or lower sampling rate) in a distinguishable manner (e.g., from the perspective of a listener) than audio encoded at the maximum sampling rate previously determined. The backend system(s) 304 may select, from amongst the plurality of formats of digitally encoded audio associated with the video asset, a format encoded at the new maximum sampling rate. The backend system(s) 304 may generate data comprising a subsequent portion of the video asset and corresponding audio (e.g., audio encoded at the new maximum sampling rate) and may communicate (e.g., via the network(s) 306) the data comprising the subsequent portion of the video asset and the corresponding audio to the user device 308 (e.g., for display and production by the user system 302).

Figure 5:
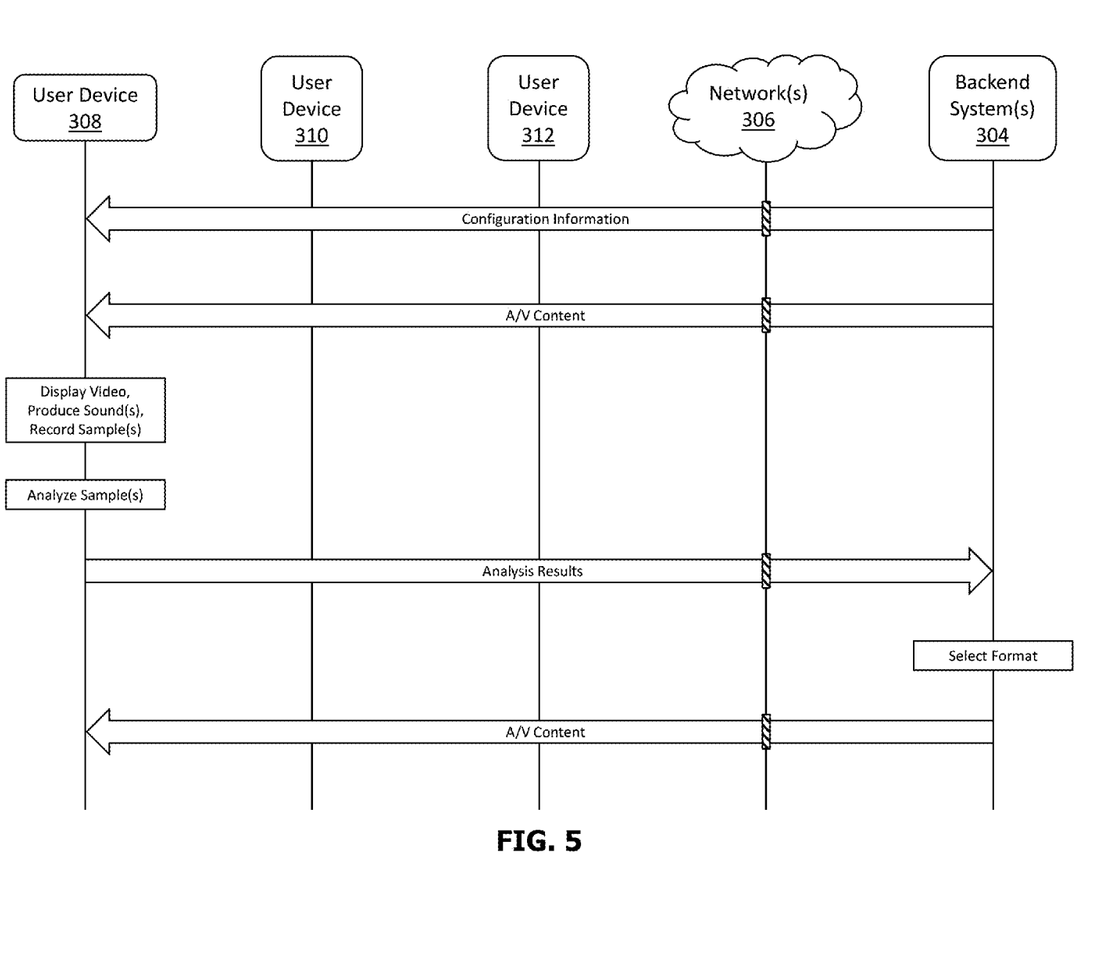

Referring to FIG. 5, as described above with respect to FIG. 4, the backend system(s) 304 may generate data comprising configuration information and may communicate (e.g., via the network(s) 306) the data comprising the configuration information to the user device 308. For example, a user of the user system 302 may have selected media content available from the backend system(s) 304, which may have initiated a configuration routine configured to cause the backend system(s) 304 to generate the data comprising the configuration information and communicate the data comprising the configuration information to the user device 308. As indicated above, such configuration information may be configured to cause the user system 302 to produce one or more sounds encoded within digital audio content, to record one or more samples of the sound(s) as produced by the user system 302, and/or to cause the user system 302 to instruct a user to physically locate one or more of the user devices 308, 310, and 312 (e.g., a device configured to record the sample(s) of the sound(s)) in one or more specified physical locations (e.g., a location where the user intends to consume media content, or the like). In some embodiments, the configuration information may comprise instructions configured to cause the user system 302 to analyze the sample(s) of the sound(s) and to communicate results of the analysis to the backend system(s) 304.

The backend system(s) 304 may generate data comprising digital media content (e.g., digitally encoded audio and/or video, or the like) and may communicate (e.g., via the network(s) 306) the data comprising the digital media content to the user device 308. For example, the selected media content may comprise a digitally encoded video asset (e.g., a movie, television program, or the like) and a plurality of formats of digitally encoded audio associated with the video asset, and the backend system(s) 304 may generate data comprising at least a portion of the video asset and corresponding audio and may communicate (e.g., via the network(s) 306) the data comprising the at least a portion of the video asset and the corresponding audio to the user device 308. The data comprising the at least a portion of the video asset and the corresponding audio may comprise one or more sound(s) that the user system 302 is configured to record (e.g., the corresponding audio may include such sound(s)). The user device 308 may cause the user system 302 to display the graphical or video content, produce the sound(s), and record the sample(s) of the sound(s) as produced by the user system 302. The user device 308 may cause the user system 302 to analyze the sample(s). For example, each of the sound(s) may have been encoded using a different format of the plurality of formats of digitally encoded audio associated with the video asset, and the user device 308 may cause the user system 302 to analyze the sample(s) to determine a format for the user system 302. The user device 308 may generate data comprising results of the analysis and may communicate (e.g., via the network(s) 306) the data comprising the results of the analysis to the backend system(s) 304. The backend system(s) 304 may select, from amongst the plurality of formats of digitally encoded audio associated with the video asset, the format determined by analyzing the sample(s) and may generate data comprising a subsequent portion of the video asset and corresponding audio (e.g., audio encoded in accordance with the format determined by analyzing the sample(s)) and may communicate (e.g., via the network(s) 306) the data comprising the subsequent portion of the video asset and the corresponding audio to the user device 308 (e.g., for display and production by the user system 302).

Figure 6:
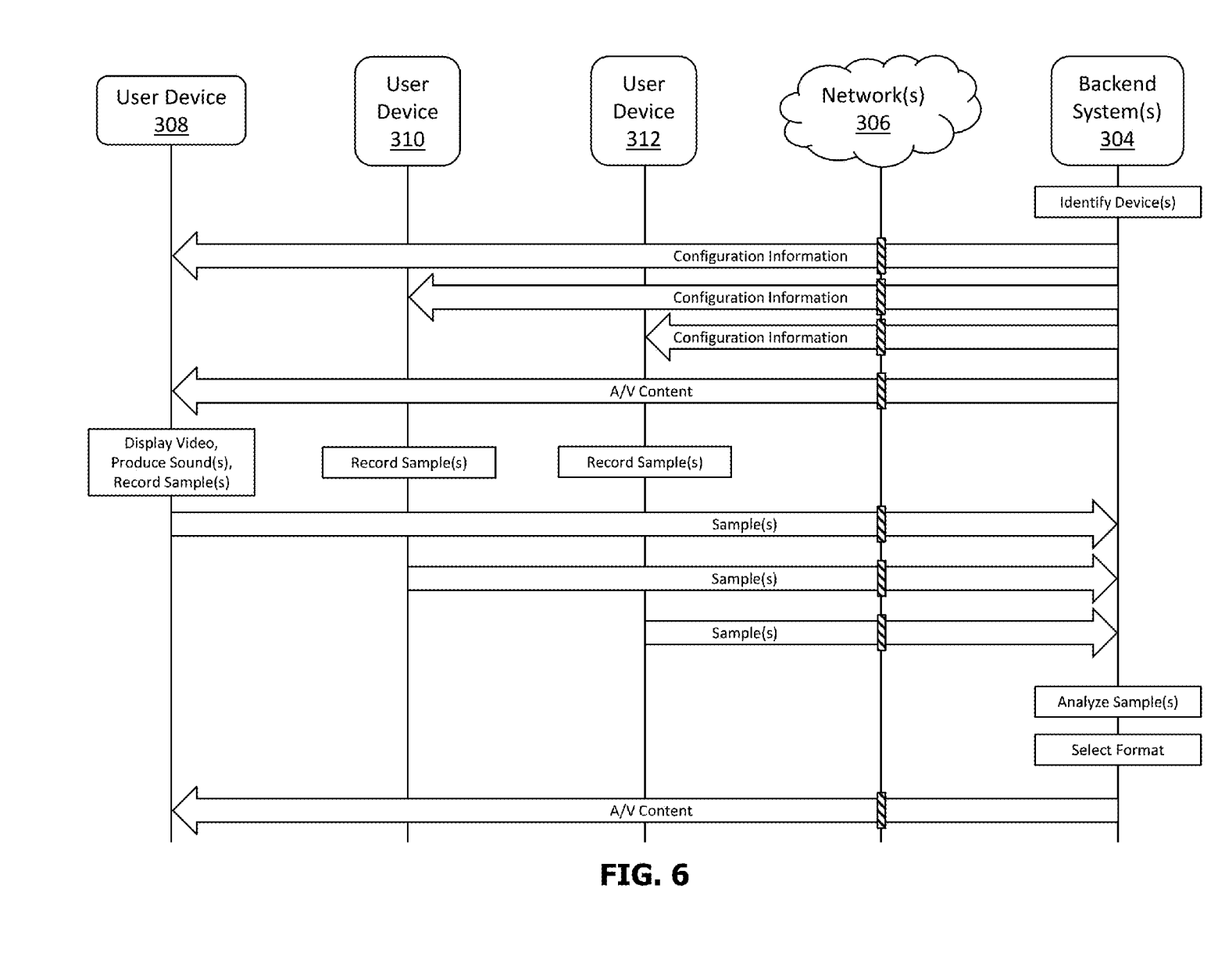

Referring to FIG. 6, the backend system(s) 304 may identify one or more user devices associated with the user system 302. For example, a user of the user system 302 may have selected (e.g., via the user device 308) media content available from the backend system(s) 304, and the backend computing system(s) 304 may determine that the user devices 308, 310, and 312 are associated with the user system 302 (e.g., based on their inclusion within the user system 302, connection to a network associated with the user system 302, affiliation with a service provider or an account thereof, or the like). The backend system(s) 304 may generate data comprising configuration information for the user device 308 and may communicate (e.g., via the network(s) 306) the data comprising the configuration information to the user device 308. Similarly, the backend system(s) 304 may generate data comprising configuration information for the user device 310 and may communicate (e.g., via the network(s) 306) the data comprising the configuration information to the user device 310, and the backend system(s) 304 may generate data comprising configuration information for the user device 312 and may communicate (e.g., via the network(s) 306) the data comprising the configuration information to the user device 312. For example, selection of the media content may have initiated a configuration routine configured to cause the backend system(s) 304 to generate the data comprising the configuration information and communicate the data comprising the configuration information to the user devices 308, 310, and 312.

As indicated above, such configuration information may be configured to cause the user system 302 to produce one or more sounds encoded within digital audio content and to record one or more samples of the sound(s) as produced by the user system 302. For example, the configuration information communicated to the user device 308 may be configured to cause the user device 308 to cause the user system 302 to produce one or more sounds encoded within digital audio content and to record (e.g., via a microphone associated with the user device 308) one or more samples of the sound(s) as produced by the user system 302. Similarly, the configuration information communicated to the user device 310 may be configured to cause the user device 310 to record (e.g., via a microphone associated with the user device 310) one or more samples of the sound(s) as produced by the user system 302, and the configuration information communicated to the user device 312 may be configured to cause the user device 312 to record (e.g., via a microphone associated with the user device 312) one or more samples of the sound(s) as produced by the user system 302. The configuration information (e.g., the configuration information communicated to the user device 308, the configuration information communicated to the user device 310, and/or the configuration information communicated to the user device 312) may be further configured to cause the user system 302 to instruct a user to physically locate one or more of the user devices 308, 310, and 312 in one or more specified physical locations (e.g., to locate the user device 308 near the display 314, to locate the user device 310 in front of and to the left of the display 314, and to locate the user device 312 in front of and to the right of the display 314).

The backend system(s) 304 may generate data comprising digital media content (e.g., digitally encoded audio and/or video, or the like) and may communicate (e.g., via the network(s) 306) the data comprising the digital media content to the user device 308. For example, the selected media content may comprise a digitally encoded video asset (e.g., a movie, television program, or the like) and a plurality of formats of digitally encoded audio associated with the video asset, and the backend system(s) 304 may generate data comprising at least a portion of the video asset and corresponding audio and may communicate (e.g., via the network(s) 306) the data comprising the at least a portion of the video asset and the corresponding audio to the user device 308. The data comprising the at least a portion of the video asset and the corresponding audio may comprise one or more sound(s) that the user system 302 is configured to record (e.g., the corresponding audio may include such sound(s)). In some embodiments, the sound(s) may comprise one or more tones configured for subsequent analysis. For example, the tone(s) may be configured to be played through one or more specific audio channels of the user system 302 (e.g., the tone(s) may include a tone configured to be played through a front, left channel of the user system 302 (e.g., the speaker 316), a tone configured to be played through a center channel of the user system 302 (e.g., the speaker 318), a tone configured to be played through a front, right channel of the user system 302 (e.g., the speaker 320), a tone configured to be played through a rear, left channel of the user system 302 (e.g., the speaker 322), and/or a tone configured to be played through a rear, right channel of the user system 302 (e.g., the speaker 324)).

The user device 308 may cause the user system 302 to display the graphical or video content, produce the sound(s), and record the sample(s) of the sound(s) as produced by the user system 302. The user device 310 may record the sample(s) of the sound(s) as produced by the user system 302. The user device 312 may record the sample(s) of the sound(s) as produced by the user system 302. The user device 308 may communicate (e.g., via the network(s) 306) the sample(s) it recorded to the backend system(s) 304. Similarly, the user device 310 may communicate (e.g., via the network(s) 306) the sample(s) it recorded to the backend system(s) 304, and the user device 312 may communicate (e.g., via the network(s) 306) the sample(s) it recorded to the backend system(s) 304. The backend system(s) 304 may analyze the sample(s). For example, the sample(s) may comprise a plurality of channels, each of which may correspond to a microphone that recorded a portion of the sample(s) (e.g., a channel corresponding to a portion of the sample(s) recorded by the microphone associated with the user device 308, a channel corresponding to a portion of the sample(s) recorded by the microphone associated with the user device 310, and/or a channel corresponding to a portion of the sample(s) recorded by the microphone associated with the user device 312), and the backend system(s) 304 may analyze the sample(s) (e.g., by comparing recording(s) (e.g., of the tone(s)) produced by each of the user devices 308, 310, and 312 to one another) to determine a number of channels within the digitally encoded audio corresponding to the at least a portion of the video asset that the user system 302 distinguishably produced relative to each other channel within the digitally encoded audio corresponding to the at least a portion of the video asset. For example, the user system 302 may include hardware configured to produce five separate channels of audio (e.g., the speakers 316, 318, 320, 322, and 324), however, due to a configuration of the user system 302 (e.g., speakers 316, 318, and 320 may be located too close to one another), the backed system(s) 304 may determine based on the analysis of the sample(s) that the user system 302 does not distinguishably produce the five separate channels relative to one another but instead produces three. The backend system(s) 304 may select, from amongst the plurality of formats of digitally encoded audio associated with the video asset, a format comprising the number of channels the user system 302 distinguishably produced and may generate data comprising a subsequent portion of the video asset and corresponding audio (e.g., audio encoded in accordance with the format comprising the number of channels the user system 302 distinguishably produced) and may communicate (e.g., via the network(s) 306) the data comprising the subsequent portion of the video asset and the corresponding audio to the user device 308 (e.g., for display and production by the user system 302).

Figure 7:
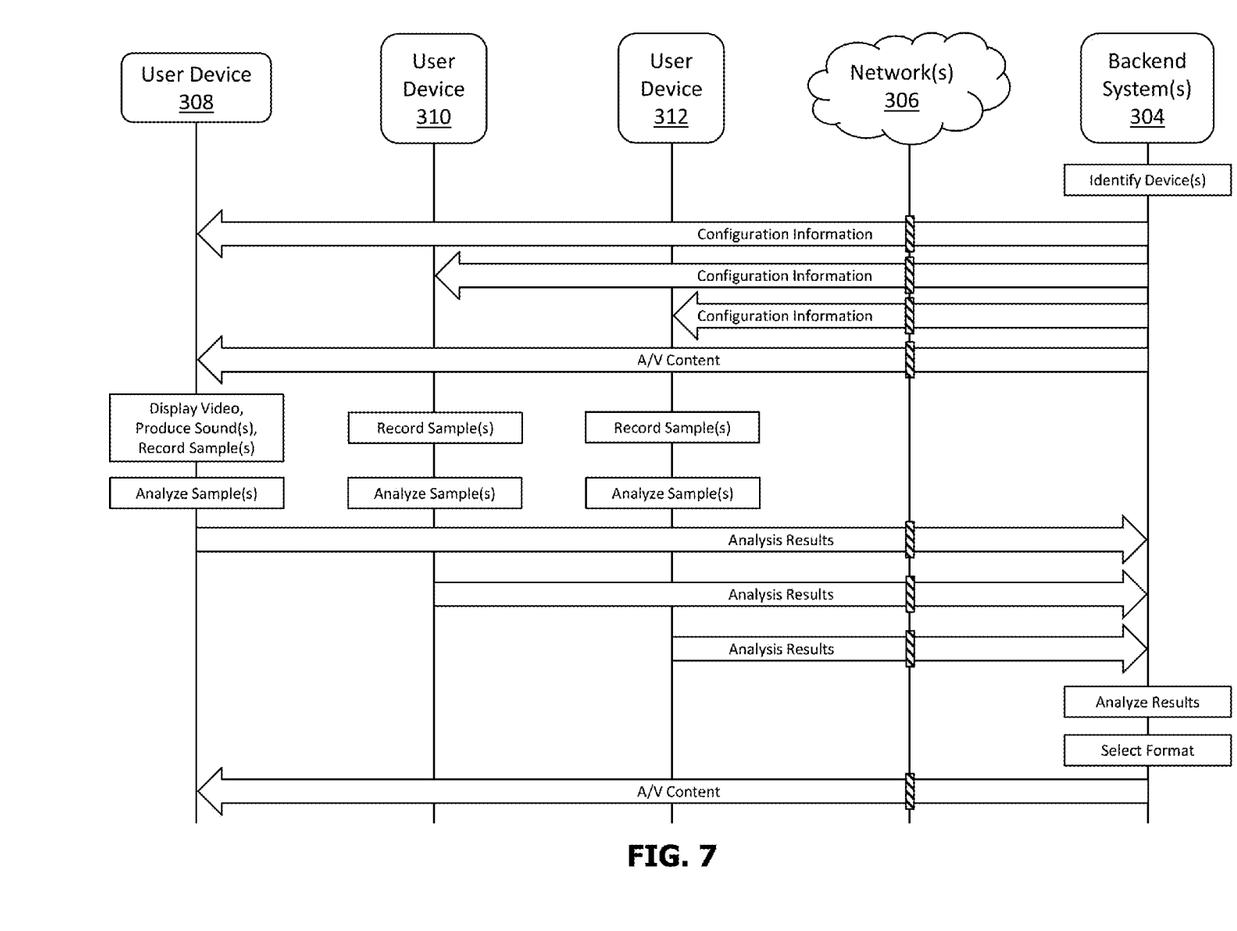

Referring to FIG. 7, the backend system(s) 304 may identify one or more user devices associated with the user system 302. For example, a user of the user system 302 may have selected (e.g., via the user device 308) media content available from the backend system(s) 304, and the backend computing system(s) 304 may determine that the user devices 308, 310, and 312 are associated with the user system 302 (e.g., based on their inclusion within the user system 302, connection to a network associated with the user system 302, affiliation with a service provider or an account thereof, or the like). The backend system(s) 304 may generate data comprising configuration information for the user device 308 and may communicate (e.g., via the network(s) 306) the data comprising the configuration information to the user device 308. Similarly, the backend system(s) 304 may generate data comprising configuration information for the user device 310 and may communicate (e.g., via the network(s) 306) the data comprising the configuration information to the user device 310, and the backend system(s) 304 may generate data comprising configuration information for the user device 312 and may communicate (e.g., via the network(s) 306) the data comprising the configuration information to the user device 312. For example, selection of the media content may have initiated a configuration routine configured to cause the backend system(s) 304 to generate the data comprising the configuration information and communicate the data comprising the configuration information to the user devices 308, 310, and 312.

As indicated above, such configuration information may be configured to cause the user system 302 to produce one or more sounds encoded within digital audio content and to record one or more samples of the sound(s) as produced by the user system 302. For example, the configuration information communicated to the user device 308 may be configured to cause the user device 308 to cause the user system 302 to produce one or more sounds encoded within digital audio content and to record (e.g., via a microphone associated with the user device 308) one or more samples of the sound(s) as produced by the user system 302. Similarly, the configuration information communicated to the user device 310 may be configured to cause the user device 310 to record (e.g., via a microphone associated with the user device 310) one or more samples of the sound(s) as produced by the user system 302, and the configuration information communicated to the user device 312 may be configured to cause the user device 312 to record (e.g., via a microphone associated with the user device 312) one or more samples of the sound(s) as produced by the user system 302. In some embodiments, the configuration information may comprise instructions configured to cause the user system 302 to analyze the sample(s) of the sound(s) and to communicate results of the analysis to the backend system(s) 304. For example, the configuration information communicated to the user device 308 may be configured to cause the user device 308 to analyze the sample(s) of the sound(s) it records and to communicate results of the analysis to the backend system(s) 304. Similarly, the configuration information communicated to the user device 310 may be configured to cause the user device 310 to analyze the sample(s) of the sound(s) it records and to communicate results of the analysis to the backend system(s) 304, and the configuration information communicated to the user device 312 may be configured to cause the user device 312 to analyze the sample(s) of the sound(s) it records and to communicate results of the analysis to the backend system(s) 304.

The backend system(s) 304 may generate data comprising digital media content (e.g., digitally encoded audio and/or video, or the like) and may communicate (e.g., via the network(s) 306) the data comprising the digital media content to the user device 308. For example, the selected media content may comprise a digitally encoded video asset (e.g., a movie, television program, or the like) and a plurality of formats of digitally encoded audio associated with the video asset, and the backend system(s) 304 may generate data comprising at least a portion of the video asset and corresponding audio and may communicate (e.g., via the network(s) 306) the data comprising the at least a portion of the video asset and the corresponding audio to the user device 308. The data comprising the at least a portion of the video asset and the corresponding audio may comprise one or more sound(s) that the user system 302 is configured to record (e.g., the corresponding audio may include such sound(s)).

The user device 308 may cause the user system 302 to display the graphical or video content, produce the sound(s), and record the sample(s) of the sound(s) as produced by the user system 302. The user device 310 may record the sample(s) of the sound(s) as produced by the user system 302. The user device 312 may record the sample(s) of the sound(s) as produced by the user system 302. The user device 308 may analyze the sample(s) of the sound(s) it records. The user device 310 may analyze the sample(s) of the sound(s) it records. The user device 312 may analyze the sample(s) of the sound(s) it records. The user device 308 may generate data comprising results of its analysis and may communicate (e.g., via the network(s) 306) the data comprising the results of its analysis to the backend system(s) 304. The user device 310 may generate data comprising results of its analysis and may communicate (e.g., via the network(s) 306) the data comprising the results of its analysis to the backend system(s) 304. The user device 312 may generate data comprising results of its analysis and may communicate (e.g., via the network(s) 306) the data comprising the results of its analysis to the backend system(s) 304. The backend system(s) 304 may analyze the results of the analyses. For example, each of the sound(s) may have been encoded using a different format of the plurality of formats of digitally encoded audio associated with the video asset, and the backend system(s) 304 may analyze the results of the analyses to determine a format for the user system 302. The backend system(s) 304 may select, from amongst the plurality of formats of digitally encoded audio associated with the video asset, the format determined by analyzing the results of the analyses and may generate data comprising a subsequent portion of the video asset and corresponding audio (e.g., audio encoded in accordance with the format determined by analyzing the results of the analyses) and may communicate (e.g., via the network(s) 306) the data comprising the subsequent portion of the video asset and the corresponding audio to the user device 308 (e.g., for display and production by the user system 302).

Figure 8:
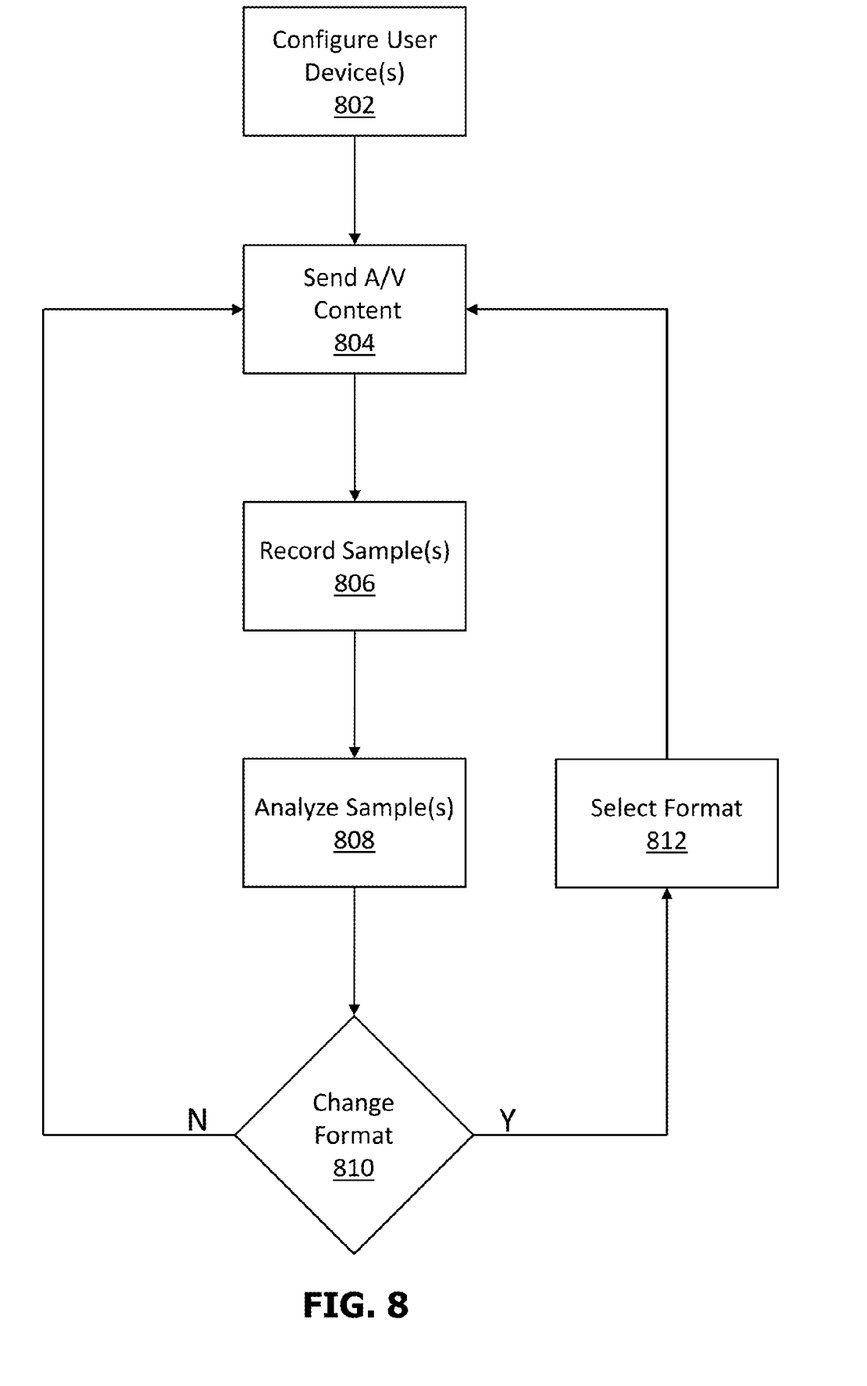
FIG. 8 depicts an illustrative method in accordance with one or more aspects of the disclosure.

FIG. 8 depicts an illustrative method in accordance with one or more aspects of the disclosure. Referring to FIG. 8, at a step 802, one or more user devices may be configured to record one or more samples of one or more sounds encoded within digitally encoded audio. For example, the backend system(s) 304 may configure the user device 308 to record one or more samples of one or more sounds encoded within digitally encoded audio associated with a video asset. At a step 804, digital media content (e.g., audio/visual content) comprising the sound(s) may be communicated to a user system associated with the user device. For example, the backend system(s) 304 may communicate data comprising a portion of the video asset and corresponding audio to the user system 302. At a step 806, the user device may record the sample(s) of the sound(s) as produced by the user system. For example, the user device 308 may record the sample(s) of the sound(s) encoded within the digitally encoded audio associated with the video asset as produced by the user system 302. At a step 808, the sample(s) may be analyzed. For example, the backend system(s) 304 may analyze the sample(s) recorded by the user device 308.

At a step 810, a determination may be made, based on results of the analysis, whether to change to a different format of the digitally encoded audio. For example, backend system(s) 304 may determine, based on the results of analyzing the sample(s) recorded by the user device 308, whether to change to a different format of the digitally encoded audio associated with the video asset. At a step 812, responsive to determining to change to a different format of the digitally encoded audio, the different format may be selected, and the method may return to the step 804, in which digital media content comprising audio digitally encoded in accordance with the selected format may be communicated to the user system. For example, responsive to determining to change to a different format of the digitally encoded audio associated with the video asset, backend system(s) 304 may select the different format and may communicate data comprising a subsequent portion of the video asset and corresponding audio digitally encoded in accordance with the selected format to the user system 302. Returning to step 810, responsive to determining not to change to a different format of the digitally encoded audio, the method may return to the step 804, in which digital media content comprising audio digitally encoded in accordance with the previously utilized format may be communicated to the user system. For example, responsive to determining not to change to a different format of the digitally encoded audio associated with the video asset, backend system(s) 304 may communicate data comprising a subsequent portion of the video asset and corresponding audio digitally encoded in accordance with the previously utilized format to the user system 302.

The methods and features recited herein may be implemented through any number of computer readable media that are able to store computer readable instructions. Examples of computer readable media that may be used include RAM, ROM, Electrically Erasable Programmable Read-Only Memory (EEPROM), flash memory or other memory technology, CD-ROM, DVD, or other optical disk storage, magnetic cassettes, magnetic tape, magnetic storage, and the like.

Additionally or alternatively, in at least some embodiments, the methods and features recited herein may be implemented through one or more Integrated Circuits (ICs). An IC may, for example, be a microprocessor that accesses programming instructions or other data stored in a ROM. In some embodiments, a ROM may store program instructions that cause an IC to perform operations according to one or more of the methods described herein. In some embodiments, one or more of the methods described herein may be hardwired into an IC. For example, an IC may comprise an Application Specific Integrated Circuit (ASIC) having gates and/or other logic dedicated to the calculations and other operations described herein. In still other embodiments, an IC may perform some operations based on execution of programming instructions read from ROM or RAM, with other operations hardwired into gates or other logic. Further, an IC may be configured to output image data to a display buffer.

Although specific examples of carrying out the disclosure have been described, those skilled in the art will appreciate that there are numerous variations and permutations of the above-described apparatuses and methods that are contained within the spirit and scope of the disclosure as set forth in the appended claims. Additionally, numerous other embodiments, modifications, and variations within the scope and spirit of the appended claims may occur to persons of ordinary skill in the art from a review of this disclosure. Specifically, one or more of the features described herein may be combined with any or all of the other features described herein.

The various features described above are merely non-limiting examples, and may be rearranged, combined, subdivided, omitted, and/or altered in any desired manner. For example, features of the servers may be subdivided among multiple processors and/or computing devices. The true scope of this patent should only be defined by the claims that follow.

What is claimed is:

1. A method comprising:
sending, by a computing system and to a user system, digitally encoded audio corresponding to a first portion of a video asset; and
sending, by the computing system and to the user system, digitally encoded audio corresponding to a second portion of the video asset and encoded in a format that is:
different from a format of the digitally encoded audio corresponding to the first portion of the video asset; and
selected, by the computing system, based on a sound encoded within the digitally encoded audio corresponding to the first portion of the video asset and produced by the user system.

2. The method of claim 1, further comprising:
selecting the format based on a sample of the sound.

3. The method of claim 1, wherein the sending the digitally encoded audio corresponding to the first portion of the video asset comprises sending, via a distribution network, by the computing system, and to the user system, data comprising:
the first portion of the video asset; and
audio corresponding to the first portion of the video asset.

4. The method of claim 1, wherein the sending the digitally encoded audio corresponding to the second portion of the video asset comprises sending, via a distribution network, by the computing system, and to the user system, data comprising:
the second portion of the video asset; and
audio corresponding to the second portion of the video asset.

5. The method of claim 1, wherein the sending the digitally encoded audio corresponding to the first portion of the video asset comprises sending digitally encoded audio comprising audio encoded at a plurality of different sampling rates, and wherein the format is a format encoded at a maximum sampling rate, of the plurality of different sampling rates, that the user system can distinguishably produce, as determined based on an analysis of a sample of the sound.

6. The method of claim 1, wherein the sending the digitally encoded audio corresponding to the first portion of the video asset comprises sending digitally encoded audio comprising a plurality of different channels, and
the method further comprising selecting, based on a number of channels that an analysis of a sample of the sound indicates the user system can distinguishably produce, as determined based on an analysis of a sample of the sound, the format.

7. The method of claim 1, further comprising determining a level of background noise associated with an environment in which the user system produced the sound, and
the method further comprising selecting, based on the level of background noise, the format.

8. The method of claim 7, further comprising responsive to a determination that the level of background noise has changed, selecting, by the computing system, a different format.

9. The method of claim 1, further comprising selecting, by the computing system and based on a sample of the sound, the format.

10. The method of claim 9, wherein the second portion of the video asset is subsequent to the first portion of the video asset.

11. The method of claim 9, further comprising:
receiving, by the computing system and from the user system, the sample; and
performing, by the computing system, an analysis of the sample.

12. The method of claim 9, wherein the user system comprises a plurality of microphones, wherein the sample comprises a plurality of channels, each channel of the plurality of channels corresponding to a different microphone of the plurality of microphones, and
the selecting is further based on analysis of each of the plurality of channels.

13. The method of claim 9, wherein the user system comprises a plurality of distinct user devices, wherein the sample comprises a recording, generated by a first user device of the plurality of distinct user devices, of the sound as produced by a second user device of the plurality of distinct user devices, and
the selecting is further based on an analysis of the recording.

14. The method of claim 13, further comprising receiving, by the computing system and from the user system, data comprising results of the analysis of the recording, and
wherein the selecting is further based on the data comprising the results.

15. The method of claim 13, further comprising:
receiving, by the computing system and from the user system, the sample; and
performing, by the computing system, the analysis of the recording.

16. The method of claim 1, further comprising sending, by the computing system and to the user system, instructions for a user to place a user device of the user system in a particular location to detect the sound.

17. The method of claim 9, wherein the sound comprises one or more tones, wherein the sample comprises a recording, generated by the user system, of the one or more tones as produced by the user system, and
the selecting is further based on an analysis of the recording.

18. A method comprising:
    sending, by a computing system and to a user system, digitally encoded audio corresponding to a first portion of a video asset, wherein the digitally encoded audio is encoded in a first digital audio encoding format;
    receiving, by the computing system and from the user system, a sample of the digitally encoded audio corresponding to the first portion of the video asset;
    selecting, by the computing system and based on an analysis of the sample, a second digital audio encoding format, different from the first digital audio encoding format; and
    sending, by the computing system and to the user system, audio corresponding to a second portion of the video asset, wherein the audio corresponding to the second portion of the video asset is encoded in the second digital audio encoding format.

19. The method of claim 18, wherein the user system comprises a plurality of microphones,
    wherein the sample comprises a plurality of channels, each channel of the plurality of channels corresponding to a different microphone of the plurality of microphones, and
    wherein the selecting the second digital audio encoding format comprises selecting the second digital audio encoding format based on analysis of each of the plurality of channels.

20. A system comprising:
    at least one backend device comprising:
        one or more processors; and
        memory storing executable instructions that, when executed by the one or more processors, cause the at least one backend device to:
            send, to at least one user device, digitally encoded audio corresponding to a first portion of a video asset; and
            send, to the at least one user device, digitally encoded audio corresponding to a second portion of the video asset and encoded in a format that is:
                different from a format of the digitally encoded audio corresponding to the first portion of the video asset, and
                selected based on a sound encoded within the digitally encoded audio corresponding to the first portion of the video asset and produced by at least one user device; and
    the at least one user device comprising:
        one or more processors; and
        memory storing executable instructions that, when executed by the one or more processors of the at least one user device, cause the at least one user device to:
            receive the digitally encoded audio corresponding to the first portion of the video asset; and
            receive the digitally encoded audio corresponding to the second portion of the video asset.

21. The system of claim 20, wherein:
    the memory of the backend device further stores instructions that, when executed by the one or more processors of the backend device, cause the at least one backend device to select the format based on a sample of the sound,
    the at least one user device further comprises a plurality of microphones,
    the sample comprises a plurality of channels, each channel of the plurality of channels corresponding to a different microphone of the plurality of microphones, and
    the format is selected based on analysis of each of the plurality of channels.

* * * * *

UNITED STATES PATENT AND TRADEMARK OFFICE
CERTIFICATE OF CORRECTION

| | |
|---|---|
| PATENT NO. | : 9,800,905 B2 |
| APPLICATION NO. | : 14/853680 |
| DATED | : October 24, 2017 |
| INVENTOR(S) | : Dave Rose et al. |

Page 1 of 1

It is certified that error appears in the above-identified patent and that said Letters Patent is hereby corrected as shown below:

On the Title Page

Title (54):
Please delete "DEVICE BASED AUDIO-FORMAT SELECTION" and insert --DEVICE-BASED AUDIO-FORMAT SELECTION--

Signed and Sealed this
First Day of May, 2018

Andrei Iancu
*Director of the United States Patent and Trademark Office*